United States Patent
Coelho

(10) Patent No.: US 11,500,651 B2
(45) Date of Patent: Nov. 15, 2022

(54) METHOD AND SYSTEM FOR MANAGEMENT OF A LOCAL CRAFT TERMINAL APPLICATION EXECUTED BY A NETWORK ELEMENT

(71) Applicant: Xieon Networks S.à.r.l., Luxembourg (LU)

(72) Inventor: Paulo Sérgio Palmeira Coelho, Amadora (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/730,219

(22) Filed: Dec. 30, 2019

(65) Prior Publication Data

US 2021/0200557 A1 Jul. 1, 2021

(51) Int. Cl.
| | |
|---|---|
| *G06F 15/16* | (2006.01) |
| *G06F 9/445* | (2018.01) |
| *H04L 67/00* | (2022.01) |
| *H04L 41/046* | (2022.01) |
| *G06F 8/65* | (2018.01) |
| *G06F 9/455* | (2018.01) |
| *G06F 8/61* | (2018.01) |
| *H04L 41/0803* | (2022.01) |

(52) U.S. Cl.
CPC .............. *G06F 9/4451* (2013.01); *G06F 8/61* (2013.01); *G06F 8/65* (2013.01); *G06F 9/45504* (2013.01); *H04L 41/046* (2013.01); *H04L 41/0803* (2013.01); *H04L 67/34* (2013.01)

(58) Field of Classification Search
CPC ... H04L 67/34; H04L 41/046; H04L 41/0803; G06F 9/4451
See application file for complete search history.

(56) References Cited

U.S. PATENT DOCUMENTS

| | | | | |
|---|---|---|---|---|
| 2003/0208685 A1* | 11/2003 | Abdel-Rahman | ..... | G06F 21/629 713/191 |
| 2013/0331163 A1* | 12/2013 | Kroeckel | ................ | G07F 17/32 463/13 |
| 2014/0040877 A1* | 2/2014 | Goldman | .................. | G06F 8/61 717/174 |

(Continued)

OTHER PUBLICATIONS

Printed (Oct. 27, 2021) excerpt from https://en.wikipedia.org/wiki/Java_Web_Start.

(Continued)

*Primary Examiner* — Yves Dalencourt

(57) ABSTRACT

A method and system for managing execution of a local craft terminal application on a local computer system comprising accessing one of the plurality of remote network elements and obtaining therefrom a launcher application program configured to manage execution of the local craft terminal application on the local computer system, launching the launcher application program on the local computer system and determining, using the launcher application program, whether the local computer system contains an appropriate copy of the local craft terminal application, and if the local computer system does not contain the appropriate copy of the local craft terminal application, obtaining the appropriate copy of the local craft terminal application from the first one of the plurality of remote network elements.

19 Claims, 4 Drawing Sheets

(56) References Cited

U.S. PATENT DOCUMENTS

2018/0181387 A1\* 6/2018 Reynolds .............. G06F 16/182

OTHER PUBLICATIONS

Printed (Oct. 27, 2021) excerpt from https://www.java.com/en/download/faq/java_webstart.XML?printFriendly=true.
Printed (Oct. 26, 2021) excerpt from https://github.com/threerings/getdown/wiki.
Printed (Oct. 26, 2021) excerpt from https://github.com/threerings/getdown/wiki/Quick-Start.
Printed (Oct. 26, 2021) excerpt from https://github.com/threerings/getdown/wiki/Design.
Printed (Oct. 26, 2021) excerpt from https://github.com/threerings/getdown/wiki/Getdown-Dot-Text.
Printed (Oct. 26, 2021) excerpt from https://github.com/threerings/getdown/wiki/Rationale.
Printed (Oct. 26, 2021) excerpt from https://github.com/threerings/getdown/wiki/Versioned-Mode.

\* cited by examiner

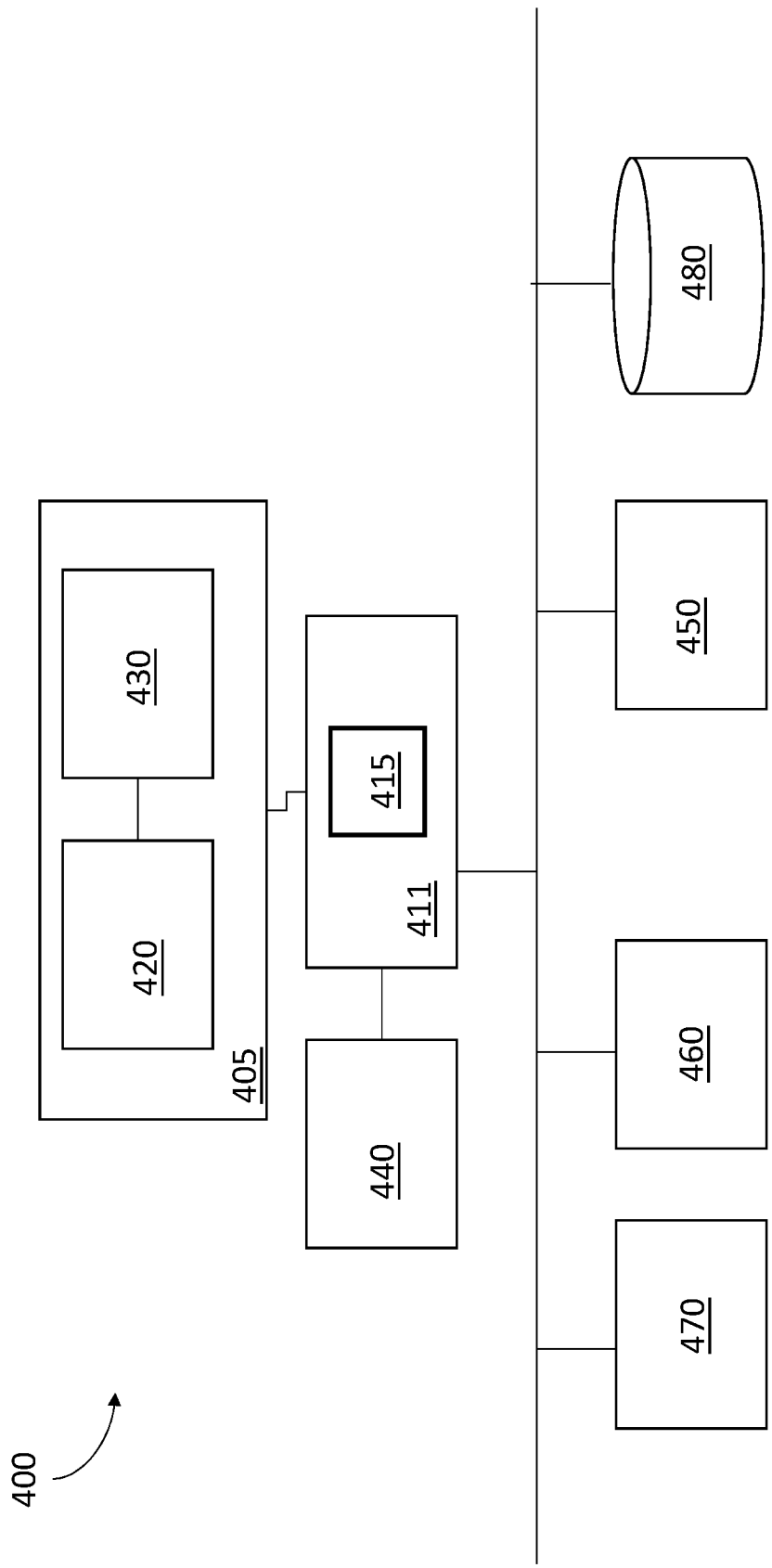

METHOD AND SYSTEM FOR MANAGEMENT OF A LOCAL CRAFT TERMINAL APPLICATION EXECUTED BY A NETWORK ELEMENT

FIELD

The present application generally relates to methods and corresponding systems for management of local craft terminal applications (LCT) executed on a local computer system.

BACKGROUND

Computer systems often use startup applications to download and run application programs. For example, Java™ Web Start allows for the downloading and running of Java applications from the web. Such applications can generally provide easy (e.g., one-click) activation of applications that guarantee that a local computer system is always running the latest version of an application, and can often be used to eliminate complicated installation or upgrade procedures.

SUMMARY OF THE INVENTION

The present disclosure relates to methods and corresponding systems for management of execution of a local craft terminal application on a local computer system. In one aspect, a method for managing execution of a local craft terminal application on a local computer system is described. The local computer system can be a local computer that is connected via a communications network to a plurality of remote network node elements. The local computer system can be configured to initially access a first remote network element and obtain, from the first remote network element, selected information including the address information of the network element and a launcher application program configured to manage execution of the local craft terminal application on the local computer system. The launcher application program can stored on the local computer system and can be launched thereon. The launcher application can determine whether the local computer system contains an appropriate copy of the local craft terminal application. In the event that the local computer system does not contain the appropriate copy of the local craft terminal application, the local computer system can communicate with the network element and download therefrom a data file that includes, among other things, the appropriate version or copy of the local craft terminal application.

The present invention is directed to a method for managing execution of a local craft terminal application on a local computer system that communicates with a plurality of remote network elements, the method comprising accessing a first one of the plurality of remote network elements and obtaining therefrom a launcher application program configured to manage execution of the local craft terminal application on the local computer system; launching the launcher application program on the local computer system and determining, using the launcher application program, whether the local computer system contains an appropriate copy of the local craft terminal application; and if the local computer system does not contain the appropriate copy of the local craft terminal application, obtaining the appropriate copy of the local craft terminal application from the first one of the plurality of remote network elements.

The method of the present invention further comprises determining if the launcher application program is already installed on the local computer system. Further, if the local computer system does not contain a copy of the launcher application program, installing the launcher application from the first one of the plurality of network elements, and executing the launcher application program on the local computer system.

The method of the invention further comprises if the launcher application program is already installed on the local computer system, verifying that the launcher application program is updated to a current version; if the launcher application program is not updated then updating the launcher application program to the current version; and executing the current version of the launcher application program on the local computer system.

The method of the invention also includes if the local craft terminal application stored on the local computer system is not the same as the local craft terminal application received from the first one of the plurality of network elements, installing the appropriate copy of the local craft terminal application received from the first one of the plurality of network elements, and executing the appropriate copy of the local craft terminal application.

The step of accessing of the method of the present invention further comprises obtaining a network address for the first one of the plurality of network elements. Further, the step of obtaining further comprises determining if the local craft terminal application stored on the local computer system is the same as the local craft terminal application stored on the first one of the plurality of remote network elements.

The method of the invention can further comprise generating configuration data for the first one of the plurality of remote network elements from the local craft terminal application stored on the local computer system, and configuring the first one of the plurality of remote network elements by sending the configuration data thereto.

The method of the present invention can further include obtaining an installer file from the first one of the plurality of remote network elements, wherein the installer file includes a server information file that includes the launcher application program and address information of the first one of the plurality of remote network elements; determining if the launcher application program is already installed on the local computer system; if the local computer system does not contain a copy of the launcher application program, installing the launcher application from the first one of the plurality of network elements; executing the launcher application program on the local computer system; obtaining the network address of the first one of the plurality of remote network elements from the server information file; and downloading from the first one of the plurality of remote network elements an application information file that includes the local craft terminal application.

The method can further include if the local craft terminal application stored on the local computer system is the same as the local craft terminal application in the application information file, and then executing the local craft terminal application; if the local craft terminal application stored on the local computer system is not the same as the local craft terminal application in the application information file received from the first one of the plurality of network elements, installing the appropriate copy of the local craft terminal application received from the application information file; and then executing the appropriate copy of the local craft terminal application.

According to another aspect of the present invention, in a communication system including a local computer system in communication with a plurality of remote network elements, a computer-implemented method for configuring a first one of the plurality of remote network elements, the method comprising accessing the first one of the plurality of remote network elements and obtaining therefrom a launcher application program configured to manage execution of the local craft terminal application on the local computer system; launching the launcher application program on the local computer system and determining, using the launcher application program, whether the local computer system contains an appropriate copy of a local craft terminal application for configuring the first one of the remote network element; if the local computer system does not contain the appropriate copy of the local craft terminal application, obtaining the appropriate copy of the local craft terminal application from the first one of the plurality of remote network elements; and transmitting configuration data from the local craft terminal application on the local computer system to the first one of the plurality of remote network elements for configuring the first one of the plurality of network elements.

The present inventions is also directed to a communication system comprising a plurality of remote network elements, each of said plurality of network elements having a launcher application program associated therewith and a local computer system in communication with the plurality of remote network elements, where the local computer system including a memory for storing instructions and a processor programmed to execute the instructions. Specifically, the processor can be programmed to access a first one of the plurality of remote network elements and obtaining therefrom the launcher application program configured to manage execution of a local craft terminal application on the local computer system; launch the launcher application program on the local computer system and determining, using the launcher application program, whether an appropriate copy of the local craft terminal application is stored thereon; and if the local computer system does not contain the appropriate copy of the local craft terminal application, obtain the appropriate copy of the local craft terminal application from the first one of the plurality of remote network elements.

In the system of the present invention, the processor can be further programmed to determine if the launcher application program is already installed on the local computer system; if the local computer system does not contain a copy of the launcher application program, install the launcher application from the first one of the plurality of network elements; and execute the launcher application program on the local computer system.

According to an aspect of the system, the processor can be further programmed to: if the launcher application program is already installed on the local computer system, verify that the launcher application program is updated to a current version; if the launcher application program is not updated then update the launcher application program to the current version; and execute the current version of the launcher application program on the local computer system.

According to another aspect of the system, the processor can be further programmed to: if the local craft terminal application stored on the local computer system is not the same as the local craft terminal application received from the first one of the plurality of network elements, install the appropriate copy of the local craft terminal application received from the first one of the plurality of network elements; and execute the appropriate copy of the local craft terminal application. The processor can be further programmed to obtain a network address for the first one of the plurality of network elements.

According to still another aspect of the system, the processor is programmed to determine if the local craft terminal application stored on the local computer system is the same as the local craft terminal application stored on the first one of the plurality of remote network elements. Further, the processor can be programmed to generate configuration data for the first one of the plurality of remote network elements from the local craft terminal application stored on the local computer system, and configure the first one of the plurality of remote network elements by sending the configuration data thereto.

According to yet another aspect of the system, the processor is programmed to obtain an installer file from the first one of the plurality of remote network elements, wherein the installer file includes a server information file that includes the launcher application program and address information of the first one of the plurality of remote network elements; determine if the launcher application program is already installed on the local computer system; if the local computer system does not contain a copy of the launcher application program, install the launcher application from the first one of the plurality of network elements; execute the launcher application program on the local computer system; obtain the network address of the first one of the plurality of remote network elements from the server information file; and download from the first one of the plurality of remote network elements an application information file that includes the local craft terminal application. Still further, the processor is programmed to if the local craft terminal application stored on the local computer system is the same as the local craft terminal application in the application information file, execute the local craft terminal application; and if the local craft terminal application stored on the local computer system is not the same as the local craft terminal application in the application information file received from the first one of the plurality of network elements, install the appropriate copy of the local craft terminal application received from the application information file, and then execute the appropriate copy of the local craft terminal application.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 4 is a high-level block diagram of digital electronic circuitry and hardware that can be used with, incorporated in, or fully or partially included in a network element, according to the teachings of the present invention.

DETAILED DESCRIPTION

Figure 1:
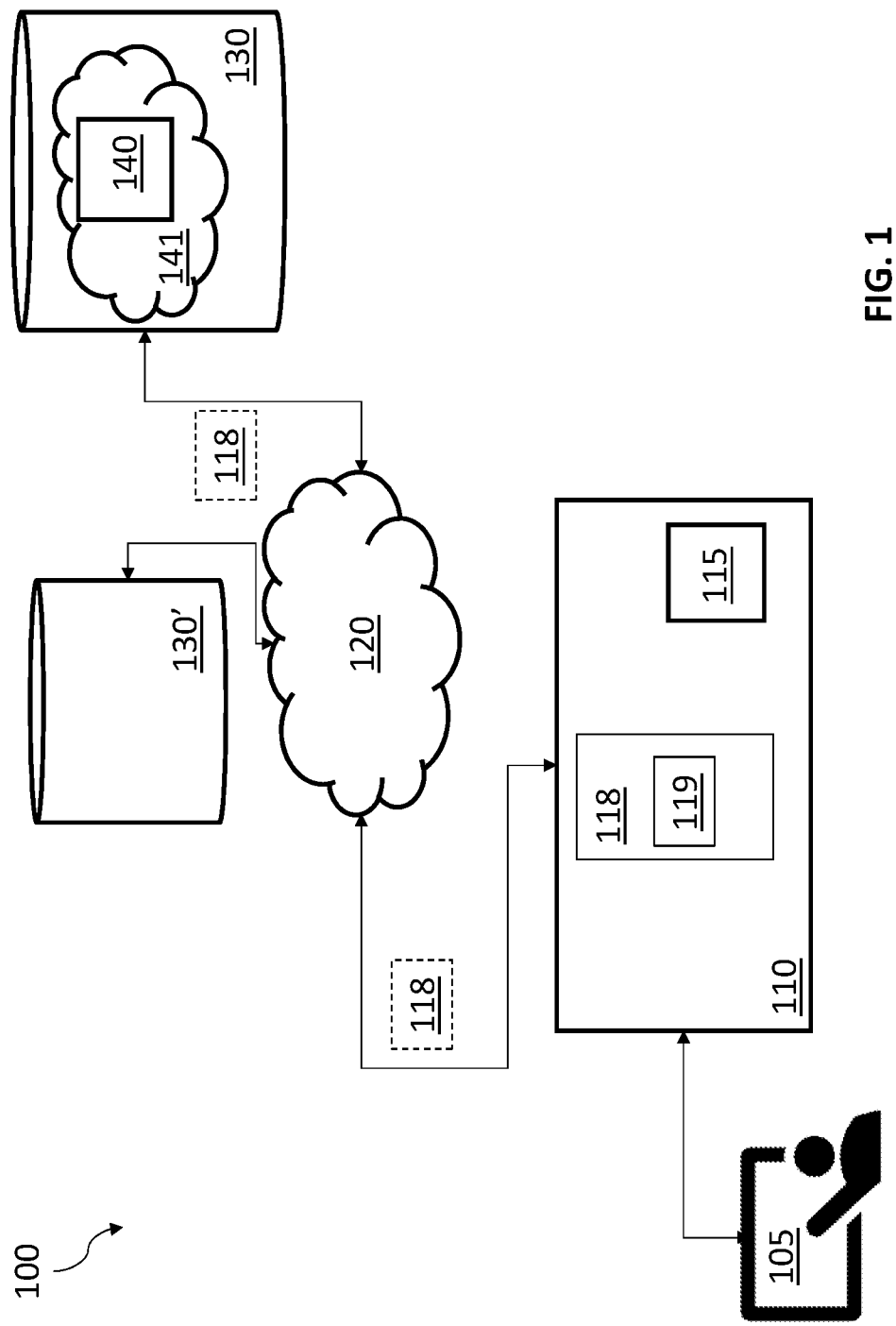
FIG. 1 is a high-level schematic illustration of a system according to the teachings of the present invention.

The present invention relates to methods and corresponding systems for management of local craft terminal applications (LCT) executed by a local computer system. Specifically, embodiments disclosed herein allow a LCT to be downloaded from a network element and executed on a local computer system, while maintaining low disk usage and providing for automatic updates, while concomitantly executing the appropriate software version for each given computer system. The network element can be any suitable hardware element that is connected to a local computer via a network, and can include for example servers, switches, integrated circuits, routers, optical network components, optical transport or transmission components (e.g., multiplexers), optical platform components, and the like.

Embodiments disclosed herein can allow application programs (e.g., Java™ programs), which are used to manage and/or control a local computer system, to be downloaded, locally installed, and then run on the local computer system. Further, since the application programs that are installed on any given local computer system directly depend on the type and/or version of the application stored on the local computer system and on the remote network element, embodiments disclosed herein are configured to provide a local computer system with appropriate versions of application programs for installation thereon.

Further, the local computer system and the network element are adapted to communicate with each other via a common data model (e.g., simple network management protocol (SNMP), Yet Another Next Generation (YANG), Extensible Markup Language (XML), and the like) and the software supporting both the network element and the local computer system is configured around this data model. As such, any application, such as a local craft terminal application, that is downloaded by the local computer system for communicating with a selected one of a plurality of network elements, needs to match the application and version resident on the network element. The local craft terminal application can be any suitable client side software application that is run thereon and which connects through a network with the remote network element. The local craft terminal application allows the local computer system to communicate with, manage, and configure the remote network elements. For example, the local craft terminal application that resides on the local computer system can send or transmit configuration data to the remote network element so as to configure the network element in any selected way or manner. Although the LCT on the local computer system and software on the network element can be assumed to be compatible since they follow a common data model, there exists the possibility that different software implementation versions exist on the network element and the local computer system. Moreover, the network element when built or installed on the network is configured to store an updated version of the local craft terminal application. The network element also includes installation or installer software, which can include for example server related files (e.g., server.info file) that includes address information about the network element, a launcher application, and other related files (e.g., graphics files). The installer software including the launcher application can be initially downloaded by the local computer system and run thereon. Once the initial download occurs, the launcher application resides on (e.g., is stored on) the local computer system. The launcher application helps maintain an up to date version of the LCT application on the local computer system and of course for launching the LCT application. The network element can also include an additional file (e.g., app.info) that includes information about the LCT application in the network element, including the version of the LCT. This file is downloaded to the local computer system when the computer system communicates with the remote network element. The installer software files when run on the local computer system determines whether there is a suitable LCT application already installed thereon of whether the local computer system needs to download the copy of the LCT stored on the network element.

FIG. 1 is a schematic illustration of a network communication system 100 according to the teachings of the present invention. As shown, the system 100 can include local network equipment or a local computer system 110. The local computer system 110 can require the use of one or more LCT applications 140. The local computer system 110 can contain an application program 115 for accessing a plurality of remote network elements or nodes (NE) 130, 130', at least one of which contains the external LCT application 140. The local computer system 110 can be configured such that it can access and download the external LCT application 140 from the remote NE 130, 130' that contains the LCT via a communication network 120. For example, the local computer system 110 can be configured to access the remote NE 130 (e.g., a server) that hosts a webpage 141, through which the local computer system 110 can access the external LCT application 140.

As detailed below, the communication network 120 can generally be any suitable communication network known and available in the art, for example, the Internet. Similarly, the NE and LCT applications can be generally any suitable NE and LCT applications available in the art, for example, the remote NE 130, 130' can be a remote server that contains a version of an application program (e.g., LCT application) required by the local computer system 110.

Figure 2:
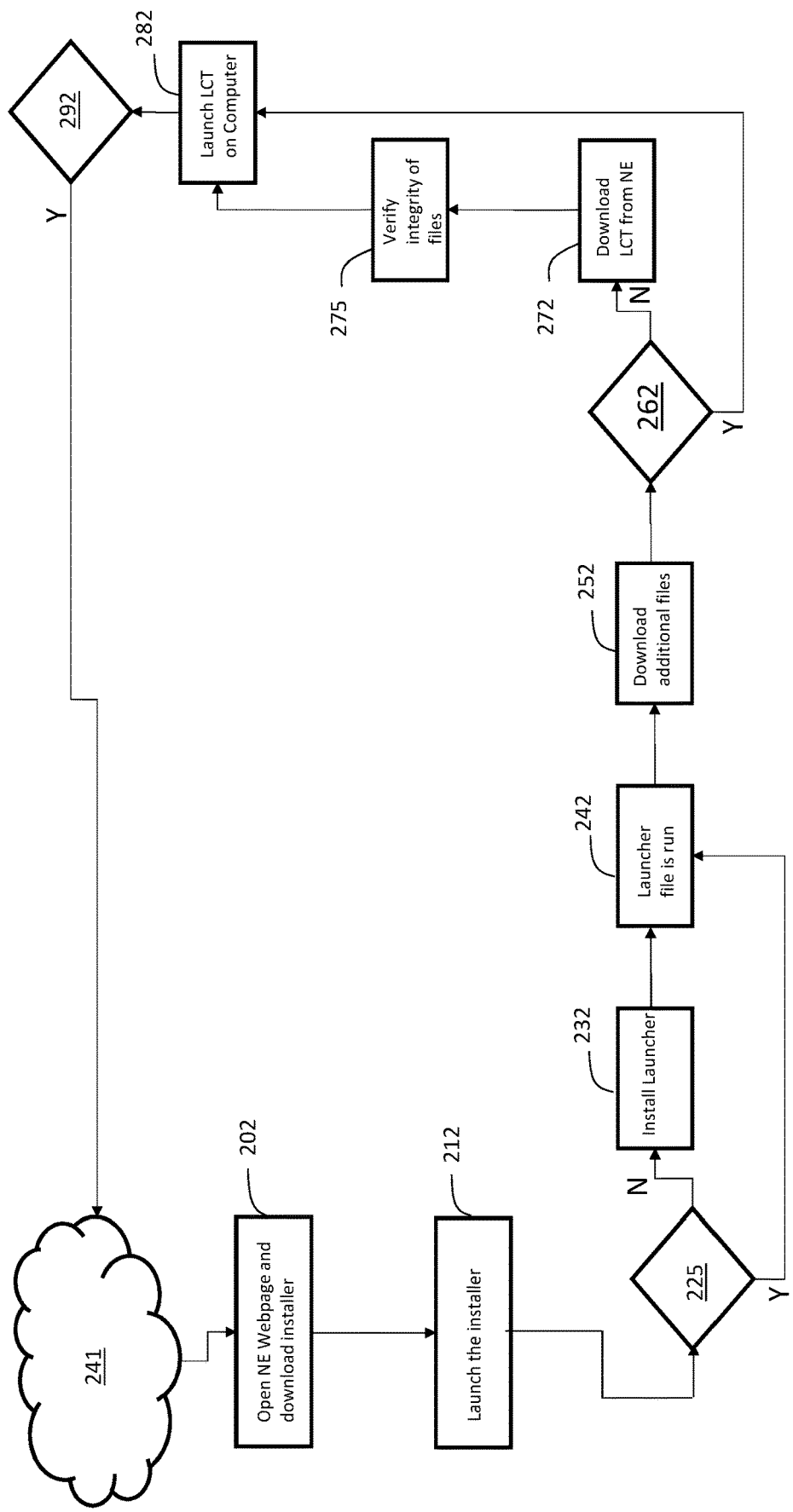
FIG. 2 is a schematic flowchart diagram showing a method for providing a local computer system with a local craft terminal application program, according to the teachings of the present invention.

Referring now to FIGS. 1 and 2, upon initially accessing the remote NE 130, an installer file 118 can be initially downloaded from the remote NE 130 to the local computer system 110 via the webpage 141. The downloading of the installer file 118 can occur automatically and/or in response to actions of a user 105 operating the local computer system 110. For example, as illustrated in FIG. 2, a user 105 operating the local computer system 110 can access a webpage 141/241 on a specific one of multiple remote network elements, such as for example the NE 130, and download the installer file 118, for example, by clicking a suitable predefined button or link, step 202. For purposes of clarity and simplicity, the installer file 118 as illustrated and described herein is initially stored on the network element 130, and is then downloaded from the NE 130 to the local computer system. The installer file 118 can contain any suitable information, including the location or address (e.g., Internet Protocol (IP) address or Internet address) of the specific remote NE 130 from which the installer file 118 was obtained, the launcher application 119, and other accessory files, such as graphics files.

The installer file 118 can be downloaded by the local computer system 110 and stored thereon for subsequent execution and launching by the local computer system, step 212. Upon installation on the local computer system 110, the installer file 118 can be responsible for verifying whether the local computer system 110 contains a local launcher, step 225. If the installer file 118 determines that the local computer system 110 already contains a local launcher (Y), it does not install a launcher on the local computer system 110. However, if the installer file 118 determines that the local computer system 110 does not contain a local launcher (N), it installs a local launcher 119 on the local computer system 110 from the installer file, step 232.

The installer file 118 can determine whether a local launcher is already present, step 225, by verifying a number of conditions. For example, the installer file 118 can determine whether the local computer system 110 includes at least one of an installation directory, information files received from the remote NE 130 (e.g., a server.info file), launcher execution files (e.g., launcher.jar files), other suitable installation files, one or more native access library files (e.g., jniaccess64.dll), and/or any other suitable files that can be used to properly integrate a launcher application in the local computer system 110. Upon verifying these factors, in an event the installer file 118 determines that the launcher application already exists (Y), the local launcher is launched on the local computer system 110, step 242.

However, if the installer 118 determines that at least one of the required files and directories for the local launcher is not present, the installer 119 on the local computer system 110 executes a complete installation of the launcher, step 232. The complete installation can create an installation directory on the local computer system 110 (e.g., on the users' folder) and store any suitable files, such as any extracted files, any files having graphic files, and/or any suitable files used to display a startup dialog.

Upon completion of the installation of the launcher 119, the local launcher is launched on the local computer system 110, step 242. Once launched, the local launcher can be configured to select a correct LCT version for launching on the local computer system 110.

Specifically, once the installation of the local launcher is complete and the local launcher 119 is launched, step 242, the launcher 119 can begin by reading a server information file (e.g., server.info) that contains a remote NE address and LCT startup parameters that are required for operation and installation of the LCT on the local computer system 110. This information can be remote NE dependent because it indicates the address of a specific remote NE that contains the appropriate version of the LCT that the local computer system requires.

In some embodiments, the launcher 119 upon reading the server information can determine that a remote network element or node 130', other than the node 130 from which the server information file is obtained, contains the appropriate version of the LCT application that the local computer system requires. In such conditions, the launcher 119 can access the node 130' that contains the appropriate LCT application and proceed to download the LCT application from that node 130'. The term "appropriate" as used herein is intended to refer to a version, type, form, and/or embodiment of an LCT application that is required by the local computer system so as to be able to properly communicate with the remote NE.

A further remote file can also be downloaded from the remote NE 130, step 252. The remote file (e.g., app.info file) can contain any suitable information, for example, including at least one of: information regarding any LCT applications that are stored in the remote NE 130 or other remote nodes, LCT file components, main startup class information, and/or any suitable startup parameters (e.g., Java Virtual Machine (JVM) startup parameters). According to one practice, the remote file can be downloaded from the remote NE to the local computer system each time the launcher is executed and the LCT is run on the system.

Using the remote file, the launcher 119 can determine whether the local computer system 110 contains an LCT installation having the appropriate functionalities required by the local computer system 110. For example, the launcher 119 can determine whether the local computer system 110 contains an LCT installation with the appropriate version number that is required by the local computer or node 110 in order to communicate with the network element 130, thus ensuring proper communication between the local computer system and the specific remote NE 130, step 262. If the launcher 119 determines that an appropriate version of the LCT is currently present on the local computer system 110 (Y), after all the required component files are checked for integrity and all parameters are read, the launcher proceeds to launch the LCT, step 282. If not (N), the launcher 119 proceeds to download the updated version of the LCT from the remote network node element 130, step 272.

Specifically, if the launcher 119 determines that an appropriate version of the LCT is not currently present on the local computer system 110 (N), step 262, then the launcher can create a folder inside the installation directory of the local computer system 110 (e.g., with the version string of the LCT as its name), and all files identified on the remote file as being associated with the required LCT (e.g., app.info) can be downloaded into the installation directory from the remote NE. The launcher 119 can also verify the integrity of the files in the installation directory, step 275, before launching the LCT program, step 282.

The launcher 119 can also continuously and/or at predetermined periods of time verify the integrity and/or the version of the LCT program stored on the local computer system 110, step 292, and determine if an update or reinstallation is required (Y). In an event the launcher determines that an update and/or a reinstallation is required, the launcher 119 can proceed with carrying out appropriate downloads for maintaining the integrity of each file comprising the LCT application and/or downloading up-to-date copies of each when necessary (e.g., uploading any new files into a new directory on the local computer system 110).

In some embodiments, the user 105 can initiate the execution of the local launcher application 119 at the local computer system 110, such as for example by double clicking a shortcut icon on a display screen at the local computer system 110 and/or by using a startup menu. This can result in the installation and/or execution of the launcher, step 275, depending on whether the launcher is locally available and/or a local installation of the launcher is required.

Figure 3:
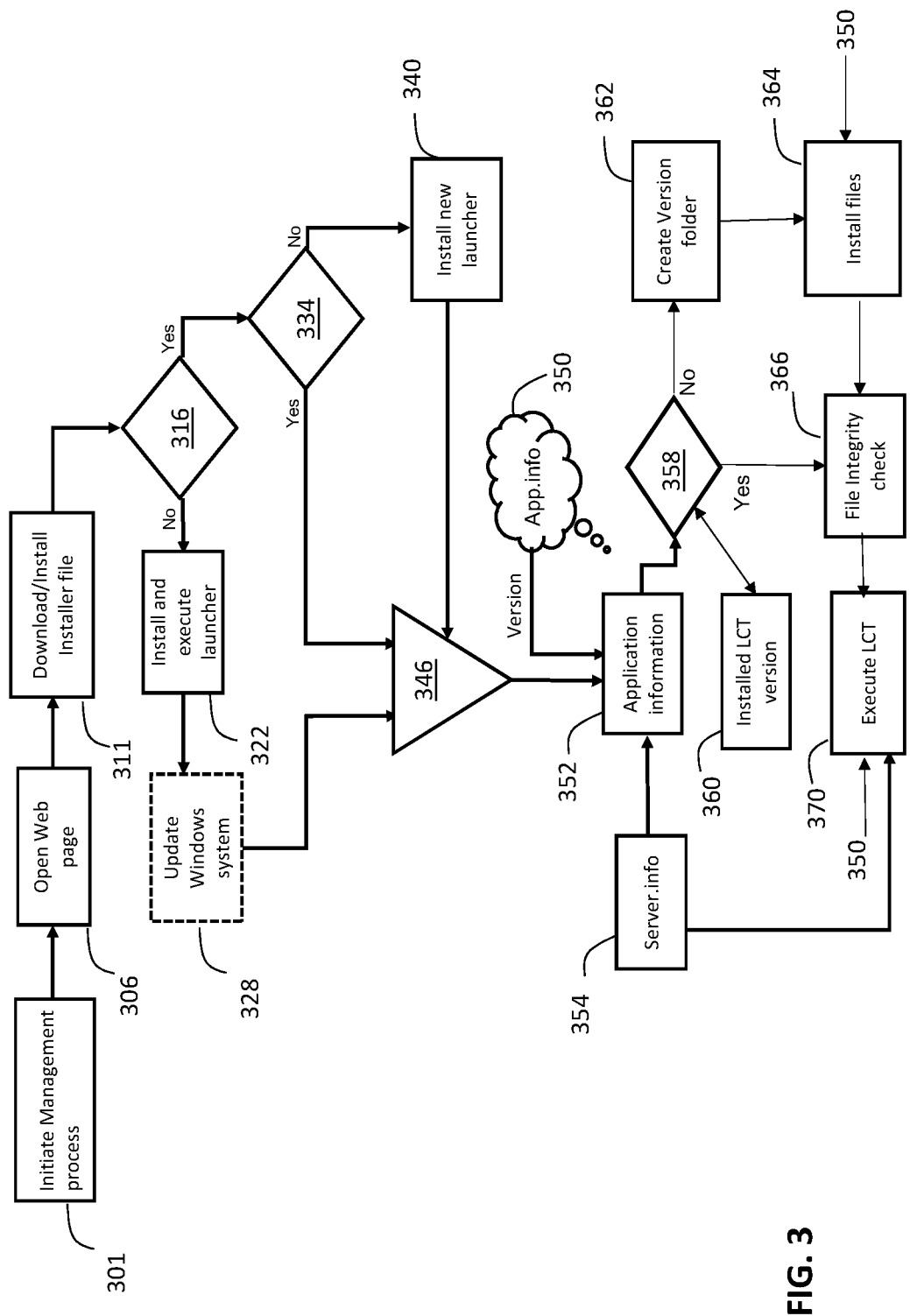
FIG. 3 is a schematic flowchart diagram showing a method for managing a local craft terminal program according to the teachings of the present invention.

FIG. 3 is an example of a system and method for management of an LCT program at a local computer system 110 according to the teachings of the present invention. As detailed above, a user 105 can initiate the management process, step 301, by opening a web page on a local computer system, step 306. For example, the user can click a button or a link to initially download and/or install an installer file from a specific remote network element 130, step 311. The installer file contains a file (e.g., server.info file) that includes the address of the remote NE, the location of where the installer was downloaded from, a launcher application, and/or any other suitable information, such as other accessory files (e.g., graphics files).

The installer can verify if a launcher is already installed on the local computer system 110 by checking: the existence of the installation directory, the server file (e.g., server.info), and a launcher file (e.g., launcher.jar), step 316. If the required launcher application does not exist (N), then the launcher application is installed and executed, steps 322 and 346. Further, in some embodiments, if operating on a Windows® platform, a native access library (e.g., jniaccess64.dll) can be used to properly integrate the launcher application in the system, step 328.

If the launcher application already exists on the local computer system (Y), then the installer can verify whether the launcher requires any updates, step 334. If the launcher application is not updated (N), then the installer file performs a complete installation of the launcher application, step 340. The installation directory can be created on a folder on the local computer system (e.g., the users' folder), and all required files, as well as graphic files used to display a startup dialog, can be extracted and copied.

Once the installation part is completed, the launcher application can be executed, step 346. Next, the launcher application begins by obtaining specific application information, step 352, such as for example by obtaining or downloading the remote file 350 (e.g., the app.info file), and/or files included in the installer, such as a server.info file, step 354, which includes the NE address and the LCT startup parameters. This information can be NE dependent.

The remote file 350 (e.g., app.info) can be downloaded from the remote NE 130. This file can contain the LCT application and version stored on the remote node, LCT file components and main startup class, and other startup files (e.g., Java Virtual Machine (JVM) startup parameters).

The launcher application can determine if an LCT installation having an appropriate version or version number for communication between the local computer system 110 and the remote NE 130 exists on the local computer system, step 358, by evaluating or checking the versions currently available on the local computer system, if any, step 360. If the appropriate version exists (Y), the LCT is launched and executed with the parameters read, step 370, after all the file components are checked for integrity, step 366. Conversely, if the appropriate version does not exist (N), then the local computer system 110 creates the necessary file folders, step 362, and then downloads the required LCT version from the NE via the app.info file 350, step 364. That is, a folder inside the installation directory is created, step 362, with the version string as its name, and all the files identified on the remote file (e.g., app.info) 350 are downloaded into the folder, step 364. Each file integrity is also verified, step 366, and the application is launched and executed, step 370.

As noted, updates to the installations can be handled similarly. For example, in the event a new version is available, the files for the new version can be copied into a new directory and executed from the new directory. Any functioning files for the older version can continue undisturbed.

The local craft terminal application 140 stored on the local computer system 110 can be employed by the user 105 to send configuration data to the remote network element 130. The configuration data generated by the local craft terminal application can be used to configure the network element. Similarly, the local craft terminal application 140 can be used to configure other network elements as well.

Embodiments disclosed herein can provide an improvement on computer technology presently available in the art by allowing usage of a remote network element (e.g., remote server) from amongst a plurality of remote network servers for downloading files and applications, such as an LCT, to a local computer. Specifically, existing computer technology requires that all possible versions of the LCT application be stored on the local computer system to ensure the ability to communicate with any one of the remote network elements, which can be memory intensive and significantly slow the processing capabilities of the local computer system. Instead, the present invention significantly reduces the storage requirements by selectively downloading LCT applications from the remote servers based on remote communication needs, thus enhancing the overall processing capabilities of the local computer system. That is, the present invention downloads or updates an LCT application from a selected remote network element, thereby resulting in storage of a single (or a few) version of an LCT application on a local computer system or local node. This feature can in turn result in maintaining low disk usage, automating updates, and executing appropriate software version for each given remote NE. Further, instead of requiring a local computer system to connect to multiple servers to obtain various versions of an LCT application, embodiments disclosed herein allow a server to maintain various cached versions of an LCT and configure a local computer system to connect to the server to obtain updated version of the LCT only as needed.

Embodiments disclosed herein further improve upon the existing computer technology by employing a launcher which downloads an application from a server. In contrast, some existing technologies employ an installer that creates a user installation as well as other files, and a launcher that manages the application versions to be launched. Further, embodiments disclosed herein improve on storage space required for running an LCT, and thereby efficiency of existing computer technology, by using several control files that include most of the information required to launch, update, and/or validate the integrity of the application files. In contrast, some existing technology requires files that reside on the client and contains server side information such as address and application startup parameters (which can also contain the server address) as well as files that reside on the server and are downloaded every time the application in order to provide application version, application files and application parameters. Further, while embodiments disclosed herein require only a one-time installation of an installer and allow the local computer system to utilize the remote NE for future updates, some existing computer technologies require multiple installations of an application from many different remote network elements.

FIG. 4 is a simplified schematic block diagram of digital/electronic processing circuitry 400 or computer hardware that can be used with the embodiments disclosed herein. Without limitation, the techniques described herein can be implemented in digital electronic circuitry or in computer hardware that executes firmware, software, or combinations thereof. The implementation can be as a computer program product (e.g., a computer program tangibly embodied in a machine-readable storage device, for execution by, or to control the operation of, a data processing apparatus, such as a programmable hardware processor, a computer, or multiple computers).

Generally, the software applications and files and associated code that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet.

Further, the methods and procedures for carrying out the methods disclosed herein can be performed by one or more programmable processors executing a computer program to perform functions of the invention by operating on input data and generating output. Further, The methods and procedures disclosed herein can also be performed by, and the apparatus disclosed herein can be implemented as, special purpose logic circuitry, such as an FPGA (field programmable gate array) or an ASIC (application specific integrated circuit). Modules and units disclosed herein can also refer to portions of the computer program and/or the processor/special circuitry that implements that functionality.

Referring again to FIG. 4, the digital electronic circuitry 400 can comprise a main memory unit 405 that is connected to a processor 411 and a cache unit 440 configured to store copies of the data from the most frequently used main memory 405.

The processor 411 can be any suitable processor for execution of a computer program. For example, the processor 411 can be a general and/or special purpose microprocessor and/or a processor of a digital computer. The processor can be configured to receive and execute instructions received from the main memory 405.

Further, the processor 411 can comprise a central processing unit (CPU) 415 that includes processing circuitry configured to manipulate instructions received from the main memory 405 and execute various instructions. The CPU 415 can be any suitable processing unit known in the art. For example, the CPU 415 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. Alternatively or additionally, the processor can comprise at least one of a multi-core processor and a front-end processor.

Generally, the processor 411 can be embodied in any suitable manner. For example, the processor 411 can be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. Additionally or alternatively, the processor 411 can be configured to execute instructions stored in the memory 405 or otherwise accessible to the processor 411. As such, whether configured by hardware or software methods, or by a combination thereof, the processor 411 can represent an entity (e.g., physically embodied in circuitry) capable of performing operations according to embodiments disclosed herein while configured accordingly. Thus, for example, when the processor 411 is embodied as an ASIC, FPGA or the like, the processor 411 can be specifically configured hardware for conducting the operations described herein. Alternatively, as another example, when the processor 411 is embodied as an executor of software instructions, the instructions can specifically configure the processor 411 to perform the operations described herein.

The processor 411 and the CPU 415 can be configured to receive instructions and data from the main memory 405 (e.g., a read-only memory or a random access memory or both) and execute the instructions. The instructions and other data can be stored in the main memory 405. The processor 411 and the main memory 405 can be included in or supplemented by special purpose logic circuitry. The main memory 405 can be any suitable form of volatile memory, non-volatile memory, semi-volatile memory, or virtual memory included in machine-readable storage devices suitable for embodying data and computer program instructions. For example, the main memory 405 can comprise magnetic disks (e.g., internal or removable disks), magneto-optical disks, one or more of a semiconductor memory device (e.g., EPROM or EEPROM), flash memory, CD-ROM, and/or DVD-ROM disks. The network system 100 and the local computer system 110 of the present invention can be configured to employ, for example, the memory 405 and processor 411. The processor can be programmed to execute instructions associated with the LCT application, launcher application and other files that form part of the installer file 118 and the remote file (e.g., app.info) 350 of the present invention.

The main memory 405 can comprise an operating system 420 that is configured to implement various operating system functions. For example, the operating system 420 can be responsible for controlling access to various devices, memory management, and/or implementing various functions of the asset management system disclosed herein. Generally, the operating system 420 can be any suitable system software that can manage computer hardware and software resources and provide common services for computer programs.

The main memory 405 can also hold application software 430. For example, the main memory 405 and application software 430 can include various computer executable instructions, application software, and data structures, such as computer executable instructions and data structures that implement various aspects of the embodiments described herein. For example, the main memory 405 and application software 430 can include computer executable instructions, application software, and data structures, such as computer executable instructions and data structures that implement various aspects of the content characterization systems disclosed herein, such as processing and capture of information. Generally, the functions performed by the content characterization systems disclosed herein can be implemented in digital electronic circuitry or in computer hardware that executes software, firmware, or combinations thereof. The implementation can be as a computer program product (e.g., a computer program tangibly embodied in a non-transitory machine-readable storage device) for execution by or to control the operation of a data processing apparatus (e.g., a computer, a programmable processor, or multiple computers).

The processor 411 can further be coupled to a database or data storage 480. The data storage 480 can be configured to store information and data relating to various functions and operations of the content characterization systems disclosed herein. For example, as detailed above, the data storage 480 can store information including but not limited to captured information, multimedia, processed information, and characterized content.

The processor 411 can further be coupled to a display 470. The display 470 can be configured to display information and instructions received from the processor 411. Further, the display 470 can generally be any suitable display available in the art, for example a Liquid Crystal Display (LCD) or a light emitting diode (LED) display. Furthermore, the display 470 can be a smart and/or touch sensitive display that can receive instructions from a user and forwarded the received information to the processor 411.

The digital circuitry 400 can further comprise an Input/Output (I/O) interface 450 that is configured to connect the processor 411 to various interfaces via an input/output (I/O) device interface 480. The circuitry 400 can further comprise a communications interface 460 that is responsible for providing the circuitry 400 with a connection to a communications network (e.g., communications network such as the Internet). Transmission and reception of data and instructions can occur over the communications network.

The foregoing description may provide illustration and description of various embodiments of the invention, but is not intended to be exhaustive or to limit the invention to the precise form disclosed. Modifications and variations of the order fulfillment system of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

It is intended that the invention not be limited to the particular embodiments disclosed above, but that the invention will include any and all particular embodiments and equivalents falling within the scope of the following appended claims.

What is claimed is:

1. In a communication system including at least a local computer system configured to communicate with at least a first remote network element of the communication system, a computer-implemented method comprising the steps of:
    establishing a local copy, on the local computer system, of a launcher application program stored on the first remote network element, if the local copy of the launcher application program does not already exist on the local computer system,
    receiving at the local computer system information provided by the first remote network element that identifies at least in part a local craft terminal application stored at the first remote network element, wherein the received information does not alone comprise a copy of the local craft terminal application,
    launching the local copy of the launcher application program on the local computer system,
    determining, using the local copy of the launcher application program launched on the local computer system and the received information, whether there already exists at the local computer system a local copy of the local craft terminal application,
    refraining from downloading to the local computer system from the first remote network element another copy of the local craft terminal application, if the determining step indicates that the local copy of the local craft terminal application does already exist,
    downloading from the first remote network element the copy of the local craft terminal application to establish on the local computer system the local copy of the local craft terminal application, if the determining step instead indicates that the local copy of the local craft terminal application does not already exist, and
    using the local copy of the local craft terminal application to at least one of:
        configure the first remote network element, and manage the first remote network element.

2. The computer-implemented method of claim 1, wherein the method further comprises a step of determining, prior to the step of establishing on the local computer system the local copy of the launcher application program, whether a copy of the launcher application program is already installed on the local computer system.

3. The computer-implemented method of claim 1, further comprising the step of obtaining a network address for the first remote network element, for use by the local computer system in accessing the first remote network element.

4. The computer-implemented method of claim 1, wherein the step of receiving at the local computer system information, provided by the first remote network element that identifies at least in part the local craft terminal application stored at the first remote network element, is executed by the local computer system when executing the local copy of the launcher application program launched on the local computer system.

5. The computer-implemented method of claim 1, further comprising the step of obtaining, from the first remote network element, an installer file for use by the local computer system, wherein the installer file comprises a server information file from which the local copy of the launcher application program is established in the establishing step if the local copy of the launcher application program does not already exist on the local computer system, and wherein the server information file comprises address information relating to the first remote network element.

6. The computer-implemented method of claim 5, further comprising the steps of:
    determining, prior to the step of establishing on the local computer system the local copy of the launcher application program, whether a copy of the launcher application program is already installed on the local computer system,
    obtaining from the server information file a network address of the first remote network element that the local computer system uses to access, at least in part, the first remote network element, and
    downloading from the first remote network element an application information file that comprises the copy of the local craft terminal application that is used to establish on the local computer system the local copy of the local craft terminal application if the determining step indicates that the local copy of the local craft terminal application does not already exist.

7. In a communication system including at least a local computer system configured to communicate with at least a first remote network element of the communication system, a computer-implemented method comprising the steps of:

accessing the first remote network element to establish a local copy, on the local computer system, of a launcher application program stored on the first remote network element, if the local copy of the launcher application program does not already exist on the local computer system, obtaining from the first remote network element, for use by the local computer system, information that identifies at least in part a local craft terminal application that is stored at the first remote network element, wherein the obtained information does not alone comprise a copy of the local craft terminal application, launching the local copy of the launcher application program on the local computer system, determining, using the launched local copy of the launcher application program on the local computer system and the obtained information, whether there already exists at the local computer system a local copy of the local craft terminal application, one of two alternative steps depending upon the result of the determining step, the two alternative steps comprising the steps of:

downloading from the first remote network element the copy of the local craft terminal application to establish on the local computer system the local copy of the local craft terminal application, if the determining step indicates that the local copy of the local craft terminal application does not already exist, refraining from downloading from the first remote network element to the local computer system the copy of the local craft terminal application, if the determining step indicates that the local copy of the local craft terminal application does already exist, using the local copy of the local craft terminal application to generate data for the first remote network element, the data for the first remote network element comprising at least one of:

configuration data for configuring the first remote network element, management data for otherwise managing the first remote network element, transmitting, from the local computer system for receipt by the first remote network element, the data for the first remote network element.

8. A communication system, comprising:

a plurality of remote network elements, wherein at least a first remote network element among the plurality of remote network elements stores a local craft terminal application, a local computer system in communication with at least the first remote network element, the local computer system including a memory for storing instructions and a processor programmed to execute the instructions to:

obtain from the first remote network element, for use by the local computer system, information that identifies at least in part the local craft terminal application, wherein the obtained information does not alone comprise a copy of the local craft terminal application, launch on the local computer system a local copy of a launcher application program stored at the first remote network element, determine, using the launched local copy of the launcher application program and the obtained information, whether a local copy of the local craft terminal application already exists on the local computer system, and if the processor determines that the local copy of the local craft terminal application does not already exist on the local computer system, download from the first remote network element to the local computer system the copy of the local craft terminal application to establish on the local computer system the local copy of the local craft terminal application, otherwise, refrain from downloading from the first remote network element to the local computer system the copy of the local craft terminal application, generate, using the appropriate local copy of the local craft terminal application on the local computer system, data for the first remote network element, the data for the first remote network element comprising at least one of:

configuration data for configuring the first remote network element, management data for otherwise managing the first remote network element, transmitting from the local computer system the data for the first remote network element.

9. The system of claim 8, wherein the processor is further programmed to determine whether a copy of the launcher application program is already installed on the local computer system.

10. The system of claim 9, wherein processor is further programmed to download a copy of the launcher application to the local computer system from the first remote network element to establish the local copy of the launcher application, and in response to a determination made using the processor that the local copy of the launcher application is not already installed on the local computer system.

11. The system of claim 8, wherein the processor is further programmed to obtain a network address for the first remote network element, for use by the local computer system in accessing the first remote network element.

12. The system of claim 8, wherein the step of obtaining, from the first remote network element the information that identifies at least in part the local craft terminal application, is executed by the processor when programmed by the local copy of the launcher application program launched on the local computer system.

13. The system of claim 8, wherein the processor is programmed to obtain an installer file for use by the local computer system, wherein the installer file comprises a server information file from which the local copy of the launcher application program is established on the local computer system in response to a determination made using the processor that the local copy of the launcher application program is not already installed on the local computer system, and wherein the server information file comprises address information relating to the first remote network element.

14. The system of claim 13, wherein the processor is further programmed to:

determine whether a copy of the launcher application program is already installed on the local computer system, establish the local copy of the launcher application program on the local computer system, in response to a determination made using the processor that the local copy of the launcher application program is not already installed on the local computer system, obtain from the server information file a network address of the first remote network element that the local computer system uses to access, at least in part, the first remote network element, and download from the first remote network element an application information file that comprises the copy of the local craft terminal application that is used to establish on the local computer system the local copy of the local craft terminal application if the processor determines that the local copy of the local craft terminal application does not already exist.

15. In a communication system including at least a local computer system and a plurality of remote network elements, a computer-implemented method comprising the steps of:

obtaining, from a first remote network element among the plurality of remote network elements, a launcher application program for the local computer system, launching the launcher application program on the local computer system, determining, using the launched launcher application program on the local computer system and information provided by the first remote network element that identifies at least in part a local craft terminal application stored at the first remote network element, whether there already exists at the local computer system a local copy of the local craft terminal application, one of two alternative steps depending upon the result of the determining step, the two alternative steps comprising the steps of:

obtaining from the first remote network element a copy of the local craft terminal application to establish the local copy of the local craft terminal application at the local computer system, if the determining step indicates that the local copy of the local craft terminal application does not already exist, refraining from obtaining from the first remote network element the copy of the local craft terminal application, if the determining step alternatively indicates that the local copy of the local craft terminal application does already exist, at least one of configuring the first remote network element and managing the first remote network element using the local copy of the local craft terminal application.

16. The computer-implemented method of claim 15, wherein the information, provided by the first remote network element that identifies at least in part the local craft terminal application stored at the first remote network element, is obtained by the local computer system when executing the local copy of the launcher application program launched on the local computer system.

17. In a communication system including at least a local computer system and a plurality of remote network elements, a computer-implemented method comprising the steps of:

receiving, at the local computer system, information provided by the first remote network element that identifies at least in part a local craft terminal application stored at the first remote network element, wherein the information provided by the first remote network element does not comprise a copy of the local craft terminal application, determining, using the information received at the local computer system, whether there already exists at the local computer system a local copy of the local craft terminal application, downloading, to the local computer system from the first remote network element, the copy of the local craft terminal application only if the determining step indicates that the local copy of the local craft terminal application does not already exist at the local computer system, and using the copy of the local craft terminal application downloaded to the local computer system to establish the local copy of the local craft terminal application at the local computer system, and at least one of configuring the first remote network element and managing the first remote network element, wherein the at least one of configuring and managing is accomplished using the local copy of the local craft terminal application established using the copy of the local craft terminal application downloaded to the local computer system.

18. The computer-implemented method of claim 17, wherein the step of determining is accomplished on the local computer system using at least in part a launcher application program downloaded from the first one of the plurality of remote network elements and launched on the local computer system.

19. The computer-implemented method of claim 17, wherein the information, provided by the first remote network element that identifies at least in part the local craft terminal application stored at the first remote network element, is obtained by the local computer system when executing the local copy of the launcher application program launched on the local computer system.

* * * * *